UNITED STATES PATENT OFFICE.

ZENO FEN DE MOSS, OF PLEASANTON, KANSAS.

IMPROVEMENT IN COMPOUNDS FOR DESTROYING WORMS AND INSECTS ON TREES, &c.

Specification forming part of Letters Patent No. 131,603, dated September 24, 1872.

*To all whom it may concern:*

Be it known that I, ZENO F. DE MOSS, of Pleasanton, in the county of Linn and State of Kansas, have invented a new and useful Improvement in Worm and Insect Remedy, of which the following is a specification:

The object of this invention is to furnish a compound to prevent the depredations of the worms and insects which prey upon fruit and other trees, especially the worm known as the "borer;" and it consists in the ingredients hereinafter named, combined in about the proportions specified.

In carrying out my invention I usually prepare sufficient to wash, say, one hundred trees; and for this purpose I use: Strong lye from potash, one gallon; soft soap, one pint; petroleum, one pint; kerosene, one-half pint.

I mix these ingredients together and add one gallon of water, and apply to the trees with a swab or woolen cloth. Apply this composition once a year, and no insect, grub, or worm will molest the tree. The kerosene and petroleum destroy the "borer."

The alkali is very invigorating, and makes the bark smooth and the tree healthy.

I do not confine myself to the particular proportions named, as variations may be made without departing from my invention.

The article known as black axle-grease may be used instead of petroleum, and coal-oil instead of kerosene, as may be desired or found convenient.

Having thus described my invention, I claim as new and desire to secure by Letters Patent—

The above-described compound, substantially as and for the purposes specified.

ZENO FEN DE MOSS.

Witnesses:
 H. H. COX,
 ELIJAH P. BARNARD.